(No Model.)

A. H. ROWAND & R. S. HUNZEKER.
COUPLING FOR PIPES.

No. 345,732. Patented July 20, 1886.

Witnesses:

Inventors:
Archibald H. Rowand
Rudolph S. Hunzeker
per Josiah W. Ells
attorney

UNITED STATES PATENT OFFICE.

ARCHIBALD H. ROWAND, OF PITTSBURG, AND RUDOLPH S. HUNZEKER, OF ALLEGHENY, PENNSYLVANIA.

COUPLING FOR PIPES.

SPECIFICATION forming part of Letters Patent No. 345,732, dated July 20, 1886.

Application filed August 5, 1885. Serial No. 173,671. (No model.)

*To all whom it may concern:*

Be it known that we, ARCHIBALD H. ROWAND and RUDOLPH S. HUNZEKER, citizens of the United States, residing, respectively, at Pittsburg and Allegheny, in the county of Allegheny and State of Pennsylvania, have invented a new and Improved Coupling for Pipes, of which the following is a specification.

Our invention relates to that class of pipes used for the conduction or conveyance of gas, water, or other fluids under pressure, and the object of our invention is to provide a means whereby the joint-connections of such pipes are made practically gas-tight, unaffected by frequent expansions and contractions of the parts.

The nature of our invention will be readily understood from the following description, taken in connection with the accompanying drawings, wherein—

Figure 1:
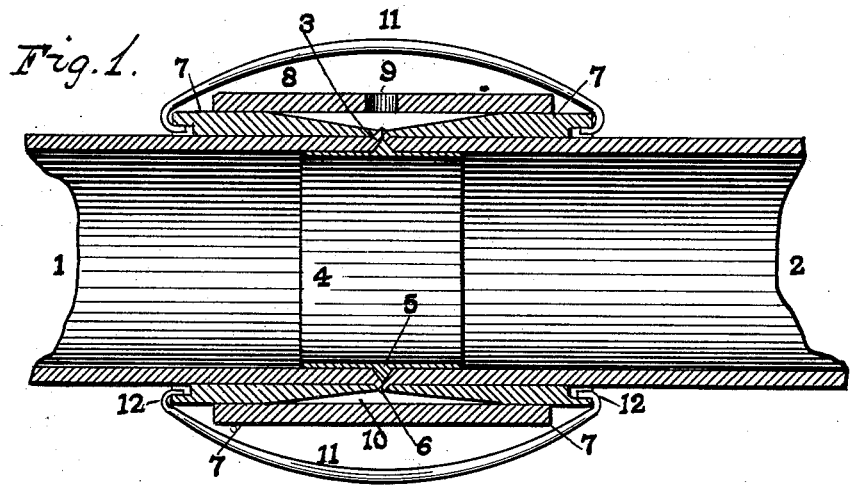
Figure 2:
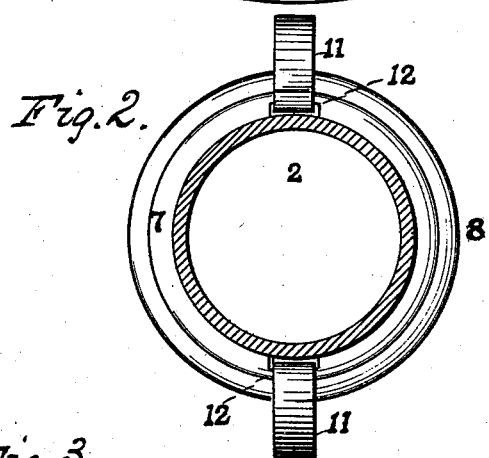
Figure 3:
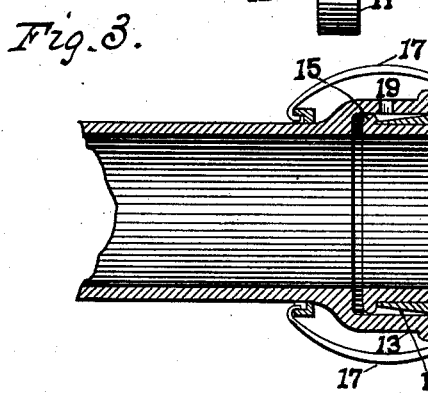

Figure 1 represents a longitudinal vertical section of two pipes joined end to end and secured together by means of our improved coupling; Fig. 2, an end view of the coupling and pipe therein. Fig. 3 represents a modified structure of the parts.

To give our invention bodily form, we use pipes 1 2 of suitable size, strength, and material, and flare the adjacent end of each outwardly, so as to form around the same a circumferentially-projecting lip, 3. The flared ends of these pipes 1 2 are slipped over and fitted tightly on a thin tubular sleeve, 4, provided with a surrounding angular flange, 5, against which the flaring ends of the pipes are made to abut in such a manner as that the projecting lip 3 of each pipe shall close over said flange 5 and come together thereon, whereby the juncture of the lips above the flange 5 on the inner sleeve, 4, shall form a small circumferential and outwardly-extending projection, 6. Around each contiguous end of these pipes 1 2 is placed a broad and tightly-fitting collar, 7, gradually thinned inwardly toward and to their approximate edges. Over these tapering collars 7, and resting snugly on their thickest portions, is arranged a stout iron band, 8, provided with a lateral aperture or hole, 9, through which any liquid, semi-liquid, or other suitable packing may be introduced into the space 10, formed between said band and the tapering parts of the wedge-shaped collars, to seal and make the joining of the pipe-lips perfectly gas-tight. Two or more stout spring-clips, 11, provided with hooked ends 12, reach from collar to collar and engage therewith in such a manner as to constantly exert a powerful drawing of the one toward the other and against the projecting lip on each pipe, holding them closely together by a yielding force that serves to resist contraction, wedge the packing, and by strong compression keep the joint from leaking. This construction of coupling requires no screws, as the several parts thereof are made perfectly plain. Consequently the pipes are free to move and adjust themselves in accordance with the laws of expansion and contraction without injury or serious disturbance of the joints.

By a modification of this coupling, as delineated in the drawings, Fig. 3, it will be seen that one of the pipes is provided with a bowl-shaped end, 13, into which its companion pipe, 14, loosely fits. This inner pipe has a small exterior flange, 15, and around the pipe is a broad wedge-shaped collar, 16, of the character hereinbefore described, and to this collar are attached several strong springs, 17, that extend back over the bowl and engage with suitable catches at the rear thereof, by which the wedge-shaped collar 16 is forcibly drawn within the bowl, leaving an angular space, 18, between them, into which suitable packing material may be entered through an opening, 19, in its side. The purpose and action of this coupling with respect to its pipes so much resembles that hereinbefore first described that no further explanation is deemed requisite or necessary.

We are aware that it is not new to hold the adjacent ends of pipes together by means of springs. We are also aware that wedge-shaped collars fitting under a sleeve and held rigidly together by bolts is not new, and such we do not claim.

Having thus set forth the nature of our invention and construction of the same, we claim—

1. A pipe-coupling consisting of a plain cylinder or band, which surrounds the adjacent ends of the pipe, a wedge-shaped collar or collars adapted to fit under said cylinder or band, and a spring or series of springs adapted to hold the wedge-shaped collar or collars under the cylinder, as set forth.

2. The combination of two pipes joined end to end, an outwardly-projecting circumferential lip on each, a broad wedge-shaped collar around each pipe, a stout band over the collars, and one or more spring-clips for drawing said collars within the band.

3. The combination of two pipes joined end to end, an outwardly-projecting circumferential lip on each, a wedge shaped collar around each pipe, a band inclosing both collars, forming a space between the collars and band, and having a hole for the introduction of suitable packing, and one or more spring-clips for drawing said collars within the band.

4. The combination of two pipes joined end to end, a projecting circumferential lip on each, a collar about and around each pipe, a band inclosing both collars, forming a space between the collars and band, and having a hole for the introduction of suitable packing.

ARCHIBALD H. ROWAND.
RUDOLPH S. HUNZEKER.

Witnesses:
JOSIAH W. ELLS,
A. WESTERVELT.